(12) United States Patent
Waller et al.

(10) Patent No.: US 9,674,354 B2
(45) Date of Patent: Jun. 6, 2017

(54) SYSTEMS AND METHODS FOR USE IN MARKETING

(71) Applicant: iSelect Ltd, Cheltenham, Victoria (AU)

(72) Inventors: Damien Michael Trevor Waller, Brighton (AU); Tony Ian George Laing, Mornington (AU); Yuval Marom, Moorabbin (AU)

(73) Assignee: iSelect Ltd., Cheltenham (AU)

( * ) Notice: Subject to any disclaimer, the term of this patent is extended or adjusted under 35 U.S.C. 154(b) by 0 days.

(21) Appl. No.: 14/433,375

(22) PCT Filed: Oct. 3, 2013

(86) PCT No.: PCT/AU2013/001133
§ 371 (c)(1),
(2) Date: Apr. 2, 2015

(87) PCT Pub. No.: WO2014/053017
PCT Pub. Date: Apr. 10, 2014

(65) Prior Publication Data
US 2015/0237205 A1     Aug. 20, 2015

(30) Foreign Application Priority Data
Oct. 3, 2012   (AU) .................................. 2012904315

(51) Int. Cl.
*H04M 3/00*     (2006.01)
*H04M 5/00*     (2006.01)
(Continued)

(52) U.S. Cl.
CPC ...... *H04M 3/5158* (2013.01); *G06Q 10/1097* (2013.01); *H04M 3/5232* (2013.01); *H04M 3/5238* (2013.01)

(58) Field of Classification Search
CPC . H04M 3/5158; H04M 3/5232; H04M 3/5238
(Continued)

(56) References Cited

U.S. PATENT DOCUMENTS 5,436,965 A     7/1995  Grossman
6,249,579 B1 *  6/2001  Bushnell ......... H04M 1/274583
                                                 379/356.01
(Continued)

FOREIGN PATENT DOCUMENTS

WO     WO 01/80538 A1    10/2001
WO     WO 2006/111952 A2 10/2006
(Continued)

OTHER PUBLICATIONS

PCT International Search Report and Written Opinion, PCT/AU2013/001133, mailed Dec. 11, 2013, 10 Pages.
(Continued)

*Primary Examiner* — Thjuan K Addy
(74) *Attorney, Agent, or Firm* — Fenwick & West LLP

(57) ABSTRACT

A method for scheduling outbound communications to sales leads based, at least partly, on a model of customer behavior derived from (i) customer data gathered from a plurality of customers that initiated contact with an electronic communications interface, and (ii) time data recording for each of the customers a time or time period at which the customer interacted with the electronic communications interface. The model predicts, for one or more time periods and segments of a population, a likelihood of successfully engaging with a person from the segment of the population. The scheduling includes prioritizing the outbound communications to the sales leads during one or more defined time periods.

16 Claims, 6 Drawing Sheets

(51) Int. Cl.
  *H04M 3/51* (2006.01)
  *G06Q 10/10* (2012.01)
  *H04M 3/523* (2006.01)

(58) Field of Classification Search
  USPC .................. 379/266.08, 266.07, 265.05
  See application file for complete search history.

(56) References Cited

U.S. PATENT DOCUMENTS

| | | | |
|---|---|---|---|
| 6,771,760 B1* | 8/2004 | Vortman | H04M 3/5191 379/209.01 |
| 7,546,243 B2 | 6/2009 | Kapadia et al. | |
| 7,970,690 B2 | 6/2011 | Diana | |
| 8,027,871 B2 | 9/2011 | Williams | |
| 8,255,255 B2 | 8/2012 | Patnaik et al. | |
| 8,358,771 B1 | 1/2013 | Moore | |
| 2002/0159475 A1 | 10/2002 | Hung et al. | |
| 2005/0228704 A1 | 10/2005 | Fishman et al. | |
| 2006/0229942 A1 | 10/2006 | Miller et al. | |
| 2006/0274758 A1 | 12/2006 | Busko | |
| 2007/0219851 A1 | 9/2007 | Taddei et al. | |
| 2008/0065476 A1 | 3/2008 | Klein et al. | |
| 2008/0162487 A1 | 7/2008 | Richter | |
| 2009/0010410 A1 | 1/2009 | Anderson et al. | |
| 2009/0037253 A1 | 2/2009 | Davidow et al. | |
| 2009/0048859 A1 | 2/2009 | McCarthy et al. | |
| 2009/0063232 A1 | 3/2009 | Lissack et al. | |
| 2009/0171752 A1 | 7/2009 | Galvin | |
| 2009/0282343 A1 | 11/2009 | Catlin et al. | |
| 2010/0054452 A1 | 3/2010 | Afzal | |
| 2011/0022475 A1 | 1/2011 | Inbar et al. | |
| 2012/0226527 A1* | 9/2012 | Carwile, Jr. | G06Q 30/0201 705/7.38 |

FOREIGN PATENT DOCUMENTS

| | | |
|---|---|---|
| WO | WO 2012/167306 A8 | 12/2012 |
| WO | WO 2015/051411 A1 | 4/2015 |

OTHER PUBLICATIONS

PCT International Search Report and Written Opinion, International Patent Application No. PCT/AU2012/000643, Aug. 8, 2012, 19 Pages.

PCT International Search Report and Written Opinion, International Application No. PCT/AU2014/050272, Oct. 31, 2014, 8 Pages.

European Patent Office, Examination Report, European Patent Application No. 12796759.4, dated Jun. 28, 2016, 8 Pages.

Australian Patent Office, Search Report and Written Opinion, Australian Patent Application No. 2012904315, Jul. 8, 2013, 6 Pages.

Homburg, C., et al., "Customer Prioritization: Does It Pay Off, and How Should It Be Implemented," Journal of Marketing, vol. 72, pp. 110-130, Sep. 2008.

Naik, P.A., et al., "Isotonic single-index model for high-dimensional database marketing," Computational Statistics & Data Analysis, vol. 47, pp. 775-790, 2004.

* cited by examiner

SYSTEMS AND METHODS FOR USE IN MARKETING

FIELD OF THE INVENTION

The present invention relates to systems and methods used in marketing goods and services. An aspect of the present invention relates to methods for use in direct marketing conducted by telephone or other real time two way communications channel. It will be convenient to describe the method in connection with marketing insurance services, but the invention should not be considered to be limited to this use.

BACKGROUND OF THE INVENTION

Businesses use many strategies and mediums to market products and services, including:

Online marketing—Online marketing can include a wide variety of techniques such as buying online advertising space such as banner advertisements on third party websites, buying priority placement in internet search results, directly selling products and services through the business's own website or websites of agents or affiliated companies; and using websites to obtain sales leads for conversion into sales via other channels.

Telemarketing—Telemarketing can involve an inbound call centre receiving enquiries about products and services from existing customers or potential new customers, whereas outbound call centres actively call customers or potential customers in an effort to sell products and services.

Mail marketing—This form of marketing can be direct, using targeted mailing campaigns or indirect leaflet drops or the like.

Traditional media advertising—Newspaper, television and radio advertising or product placements in media productions are common.

The ultimate goal of any of the above marketing techniques is to make sales, with the least wasted effort. Thus a great deal of effort goes into analysing marketing data and optimising the marketing process.

It is therefore an object of the present invention to provide improved marketing systems and methods, or at least provide a useful alternative.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In broad concept, the present invention provides a method for scheduling outbound communications, preferably outbound calls on an outbound call centre, wherein the scheduling of communications is based, at least partly, on statistics gathered from an electronic communications interface, preferably an inbound call centre. The method prioritises sales leads during a defined time period, such as during some pre-defined time period that is known to be a difficult time to successfully engage with sales leads.

Accordingly, in a first aspect of the present invention, there is provided a method for scheduling outbound communications to sales leads, wherein the scheduling of communications is based, at least partly, on a model of customer behaviour wherein the model is derived from (i) customer data gathered from a plurality of customers that initiated contact with an electronic communications interface, and (ii) time data recording for each of said customers a time or time period at which the customer interacted with the electronic communications interface. The model predicts, for one or more time periods and segments of a population, a likelihood of successfully engaging with a person from the segment of the population, and the scheduling includes prioritising the outbound communications to the sales leads during one or more defined time periods.

In a second aspect of the present invention, there is provided a method for scheduling outbound communications to sales leads during a defined time period, wherein the scheduling of communications is based, at least partly, on statistics gathered from an inbound call centre, which statistics connect customers and the time of inbound calls by the customers, and wherein the scheduling further includes prioritising the outbound communications to the sales leads during the defined time period.

Preferably, the time data is the time at which the customers initiated said contact.

In a third aspect of the present invention, there is provided a method of determining a preferred time to make an outbound communication to a sales lead comprising making the determination based, at least partly, on a model of customer behaviour wherein the model is derived from (i) customer data gathered from a plurality of customers that initiated contact with an electronic communications interface, and (ii) time data recording for each of said customers a time or time period at which the customer interacted with the electronic communications interface, wherein the model predicts, for one or more time periods and segments of a population, a likelihood of successfully engaging with a person from the segment of the population.

In a fourth aspect of the present invention, there is provided a method of scheduling an outbound communication to a sales lead, wherein the scheduling is based, at least partly, on a model of customer behaviour wherein the model is derived from (i) customer data gathered froth a plurality of customers that initiated contact with an electronic communications interface, and (ii) time data recording for each of said customers a time or time period at which the customer interacted with the electronic communications interface, wherein the model predicts, for one or more time periods and segments of a population, a likelihood of successfully engaging with a person from the segment of the population, and wherein the scheduling includes determining a preferred time to make the outbound communication based on the model.

In a fifth aspect of the present invention, there is provided a method for controlling outbound communications, preferably outbound calls on an outbound call centre, wherein the method includes:
  collecting customer data from a plurality of customers that initiated contact with an electronic communications interface;
  deriving a model from at least the collected customer data; and
  scheduling the outbound communications based at least in part on the derived model,
  wherein (i) the electronic communications interface is an inbound call centre, or (ii) the model is further derived from time data recording for each of said customers a time or time period at which the customers interacted with the electronic communications interface.

Preferably, the model predicts, for a defined time period and segment of a population, a likelihood of successfully engaging with a person from the segment of the population.

Successful engagement can, for example, be defined as any one or more of:

reaching the person from the outbound call centre;

sending a message to or leaving a message with the person, wherein the message results in a response, preferably a positive response, from the person; and completing an agreement or financial transaction with the client, for example by the client purchasing or committing to purchase goods or services.

In one embodiment, the model is a sales propensity model which models the likelihood of any particular sales lead being converted to a sale by a consultant.

In one embodiment the likelihood prediction is a measurement of past communications with people from the segment of a population during the defined time period. In an embodiment, the measurement is a probability of a person from the segment of the population interacting with the electronic interface, especially by the person calling the inbound call centre, during the defined time period, compared with at least one other time period.

Preferably, the outbound communications are scheduled by scoring a sales lead according to the model. The scoring may be weighted against scores from other models, or may define a score that is independent of other models.

In an embodiment, the sales lead is identified from an interaction of a customer, including a potential customer, with one or more websites. Preferably, sales lead is identified by determining whether or not to contact the customer by analysing the person's website usage and/or data captured on a website about the customer. In other embodiments, the sales lead is identified by data captured from emails received from the customer, or by previous verbal communications with the customer, for example via the incoming call centre.

In an embodiment of the present invention the time period correlates to a period in which a success rate in contacting and/or completing a transaction with customers is lower than an average success rate for the day. In one embodiment, the time window is approximately between 3 pm and 6 pm.

The model may include a plurality of time periods, and a predicted likelihood of success for each time period.

In any method of the present invention, the method may further include programming a dialler to establish a telecommunications channel in an order determined at least partly on the scheduling. In an embodiment, the order matches the scheduling.

The various aspects of the present invention address a trend, identified by the present inventors, that the success rate of some forms of marketing can vary depending on the time of day. For example, the present inventors have found it difficult to sell family-oriented services and products at times around the end of the work-day and school-day, specifically between 3 pm and 6 pm. The present inventors believe that this is because people are busy finishing their day's work, travelling, and/or preparing dinner.

It is a further aspect of the present invention to provide a computer readable medium storing thereon software instructions which when implemented by a computer system cause the computer system to implement a method according to an aspect of the present invention.

It is another aspect of the present invention to provide a computer system configured to perform a method according to an aspect of the invention. Preferably, the computer system comprises part of a system configured to establish communications between a plurality of customers and a plurality of sales consultants.

It is another aspect of the present invention to provide a system configured to enable communication between a plurality of customers and a plurality of sales consultants, the system including a computer system in accordance with the present invention. In an embodiment, the system includes a component configured to establish communications channels between a customer and a sales consultant.

In another aspect of the present invention, there is provided a call centre comprised of an outbound call centre and an inbound call centre and configured to perform a method in accordance with any aspect of the invention.

In various embodiments of the present invention, the component configured to establish communications channels between a customer and a sales consultant is a programmable dialler.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

Illustrative embodiments of the various aspects of the present invention will now be described by way of non limiting example only, with reference to the accompanying drawings. In the drawings.

DETAILED DESCRIPTION OF THE EMBODIMENTS

Figure 1:
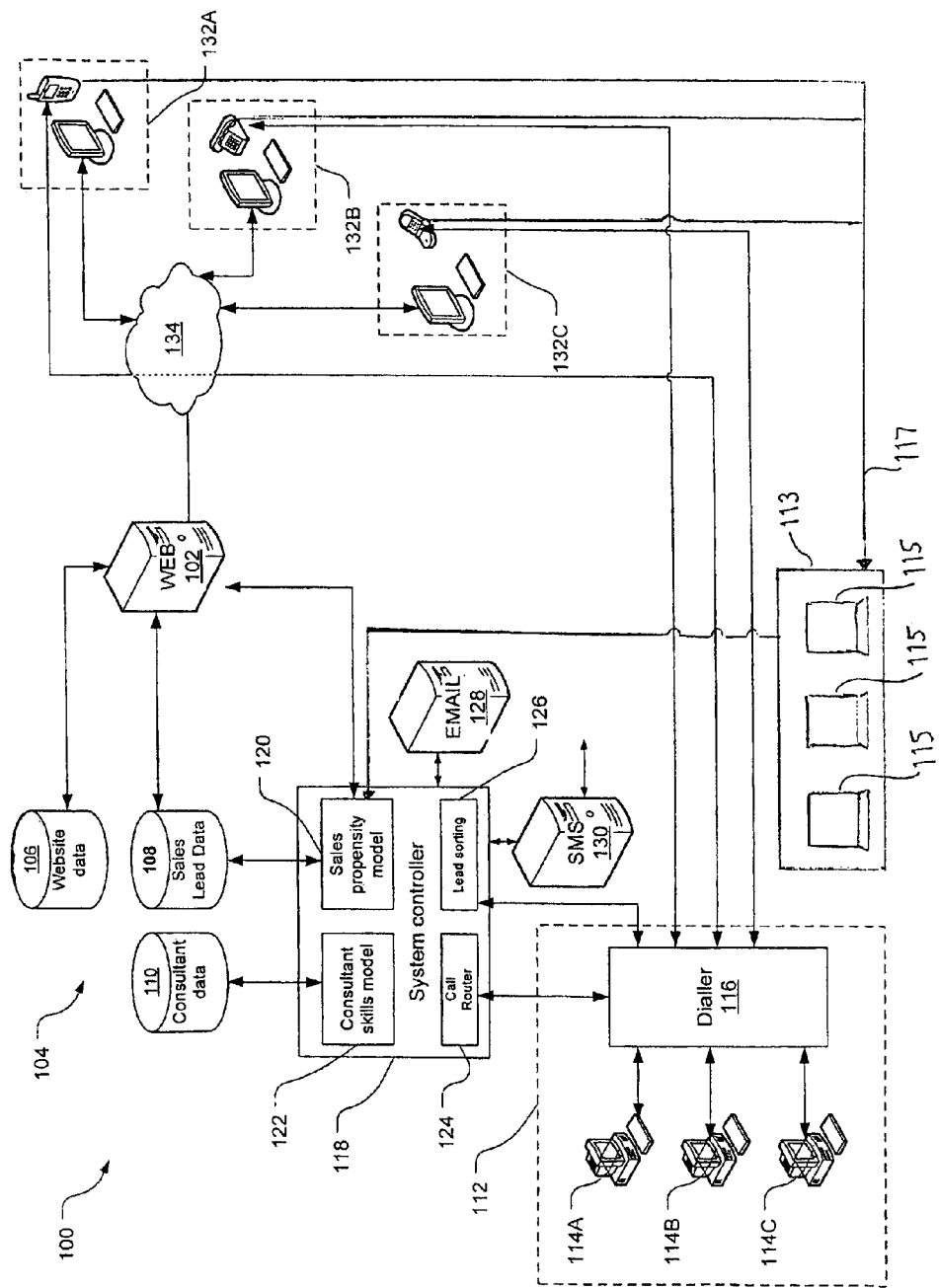
FIG. 1 is a schematic representation of a system for implementing an embodiment of the present invention.

FIG. 1 is a schematic illustrates of a system 100 which can be used to implement embodiments of the present invention. System 100 includes the following major subsystems:

(a) Web server 102. The web server 102 is configured to provide web pages to customers for advertising and selling goods or services. The web server 102 is preferably configured to dynamically generate web pages in response to customer interaction in a manner that will be described in more detail below.

(b) Data storage system 104. The data storage system 104 includes one or more databases for storing data that is used, captured and/or generated by system 100. In a preferred form, the data storage system 104 has a first component 106 storing data from which the web server 102 dynamically generates web pages for serving to customers. In another component 108 the data storage system 104 stores sales lead data relating to customers who visit the website. Most preferably, the sales lead data 108 is captured from the customer's interactions with the website served by web server 102 in accordance with the embodiment of the present invention. The data storage system 104 also stores consultant data 110. The consultant data 110 is generated by the system 100 and reflects a consultant performance measured against a plurality of metrics as will be described below. As will be appreciated by those skilled in the art, the data storage system will comprise one or more database structures and could be stored in one or more physical data storage systems. In some instances the system can be centralised, but could be a decentralised storage system or even a cloud storage system.

(c) Outbound telephone sales subsystem 112. The outbound telephone sales subsystem 112 includes a plurality of consultant terminals 114A, 114B and 114C which are connected to a dialler 116. The dialler 116 is used to establish communication channels between customers and terminals 114A through 114C to allow sales consultants to make sales calls. In addition to making calls and routing them to consultant terminals 114A to 114C the outbound telephone sales subsystem 112 will also provide sales lead data to the consultant terminal relating to the call being made. It will also gather data entered by the consultant on the call for storage in the data storage system.

(d) Inbound telephone sales subsystem 113. The inbound telephone sales subsystem 113 includes one or more consultant terminals 115 which can be connected to inbound calls 117 from a plurality of customers 132A, 132B and 132C. The inbound telephone sales subsystem 113 may, together with the outbound telephone sales subsystem 112, form a single call centre, in which case one or more of terminals 115 may be the same terminals as terminals 114A, 114B and 114C. However, in the embodiment illustrated in FIG. 1, the inbound and outbound subsystems are shown as separate call centres.

Consultants answering inbound calls on the inbound call centre 113 collect customer data, such as age, gender and any other pertinent demographic information. In the case of health insurance, customer data may also include a membership type or policy type about which the customer has enquired. Membership type defines who the membership is intended to cover, for example, whether the enquiry related to insurance for a single person, a couple or a family. The policy type defines specifics of the policy, such as whether the enquiry was for hospital coverage, ancillary coverage or combined hospital and ancillary coverage. The inbound call centre also records time data, which includes the time of day and the day of the week that the customer initiated and maintained contact with the call centre. Data may be recorded manually by the consultant receiving the call, and/or by an automated system integrated into the call centre, which prompts the customer to use their phone keypad to enter such customer data. The data is sent to system controller 118. The system controller 118 determines and maintains a model from the customer data received from the inbound call centre 113 and/or the web server 102.

(e) System controller 118. The system controller 118 is responsible for overall control of the processes implemented by the system 100. The system controller 118 maintains the model, which is used to indicate the likelihood of a particular outcome from contacting or attempting to contact a particular sales lead. In the embodiments described hereinafter, the model is a sales propensity model, which models the likelihood of any particular sales lead being converted to a sale by a consultant. The sales propensity model includes a field that indicates the likeliness that the sales lead is contactable within a specified time period—the premise being that the more available the sales lead, the more likely the sales lead will (a) engage with an attempted contact and (b) be amenable to making a purchase. It is, however, appreciated that the model may be used to indicate the likelihood of desired outcomes other than making a sale, or may include additional fields for predicting such outcomes.

System controller 118 also maintains a consultant skills model 122 which is used to track and predict the likelihood that a particular sales consultant will convert a particular sales lead into a sale.

The system controller includes a call router 124 which determines how the dialler 116 routes outbound calls to the telephone consultants, based on the output of the Consultants skills model 122. It also includes a lead sorting component 126 which performs propensity based sorting of sales leads based on the output of the sales propensity model 120. The output of the propensity sorting component is provided to the dialler 116 to control the ordering of the dialling of customers.

The system controller 118 is also connected to means for communicating with customers using a secondary communications channel. In this example, an email server 128 is provided for enabling email communication with customers, and an SMS interface 130 is provided to enable communication with customers over short message service.

In use, the plurality of customers 132A, 132B and 132C, each of which have access to a client terminal for browsing the internet (or otherwise accessing a website served by webserver 102), can access a webpage served by web server 102 via communications network 134. Each of the customers 132A to 132C possess a device (which may be the same device or a different device to that which they use to access the internet) that can receive telephone calls from the outbound call centre 112. Such phone calls can be made via any known mechanism including, but not limited to using a fixed telephone network, wireless or other cellular telephone network or voice over internet protocol telephony and should not be considered as limiting the application of the present invention.

Figure 2:
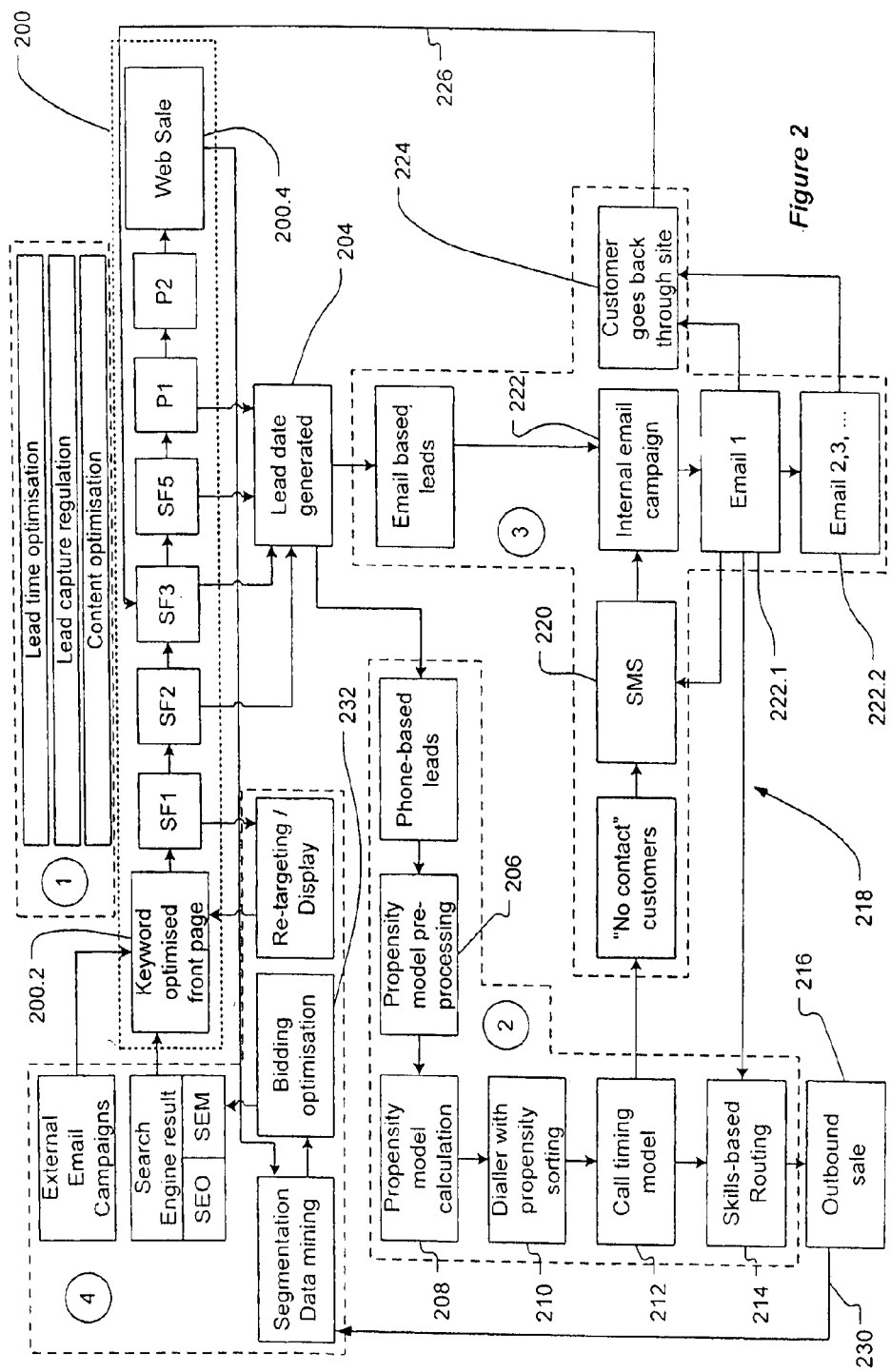
FIG. 2 illustrates a process overview including sub-processes in accordance with embodiments of selected aspects of the present invention.

Operation of various subsystems of the present invention will be described in further detail in relation to FIG. 2 onward of the specification. FIG. 2 is an overview of the operation of the system 100 and illustrates a plurality of sub processes performed by the system. In addition to the operation of the website indicated as 200 the process includes the following major sub processes:

1. Sales lead generation processes including, lead capture optimisation and regulation processes and web content optimisation (sub-process 1).
2. Outbound call centre processes, including lead prioritisation processes and consultant assignment optimisation (sub-process 2).
3. Alternative communications processes e.g. via SMS and e-mail that drives customers back through the website and subsequently through the sales process (sub-process 3).
4. Online marketing processes for re-targeting, Search Engine Optimisation (SEO), Search Engine Marketing (SEM), display advertising and e-mail marketing activities that aim to drive traffic to the website (sub-process 4).

These major sub-processes are described in more detail in the next section, however it is useful to first consider the structure and operation of the website hosted by webserver 102. The website 200 is reflected in FIG. 2 by a progression of webpages (200.2, SF1 to SF5, P1, P2, PC and 200.4). Some of the webpages, such as the home page 200.2 will be chiefly informational, in that they are intended to provide information to a customer, and lead them to the next page on the website. Others, called sales pages (e.g. those labelled SF2 to SF5, P1, PC) herein will seek to collect sales data from a customer viewing the website, the sales pages typically culminate with a page or pages on which the customer can make a purchase directly or place an order for a goods or services, such as page 200.4.

The website 200 includes a series of webpages SF1 to SF5, which represent a sales funnel driving customers towards the websales pages 200.4, on each page of the sales funnel the website 200 acquires additional information about the customer for storage in the data storage system 104. Some of the customer data acquired is data entered by the customer, but other data is acquired by analysing customer website usage or other available data.

For example the data acquisition can begin by determining the source of that customer e.g. whether they came from a search engine, an affiliate website or an e-mail campaign. In a system adapted to sell insurance, such as health insurance, the following information could be captured at each stage of the website:

TABLE 1 example sales lead data for a customer captured on respective sales pages of a website in an example of the present invention.

| Page | Data captured |
|---|---|
| Home Page 200.2: | Source of customer - e.g. search engine, banner add, e-mail campaign etc. |
| | Keywords used in a search engine |
| SF1 | State (potentially postcode) or other regional identifier |
| | Type of insurance cover being sought |
| SF2 | Reason for coming to website |
| | Date of birth |
| | Currently insured? (Potentially which insurer) |
| | Government rebates applicable |
| | Name |
| | E-mail |
| | Phone number |
| SF3 | All the benefits that are important to the customer |
| SF5 | Policies shortlisted |
| | Bookmarking activity |
| | Refine activity |
| | Brochures looked at |
| P1 | Name, phone number, e-mail address if not already provided |
| | Fund name if not already provided |
| | What sort of prize they are interested in |

As can be seen the data captured becomes more and more specific to the customer and more indicative of the buying preferences of the customer or factors that may influence the customer to make a purchase. In some instances a customer will make a purchase directly using the website and no further interaction or intervention is needed to compete the sale. However this is not always the case, and sometimes it can be advantageous to make contact with the customer through another mechanism, such as, via a telephone call to the customer made through an outbound call centre 112. Thus, as will be described below, the various aspects of the system provide processes that attempt to convert these website customers to buyers.

Sales Lead Generation from the Website (Sub-Process 1)
Sales Lead Generation

As noted above, some customers will voluntarily enter data, as noted above, into forms or the like that are presented on the sales pages of the website, thus there is a process needed for the system to generate a sales lead for actioning via the outbound call centre 112 from this data. The lead generation processes are based on the inventors' insights that certain parameters of customer's website usage represent a behaviour on the part of the customer that can be used to determine their likelihood to make a purchase. Thus lead generation is performed in a preferred embodiment, by analysing the customer's website usage and or data captured about the customer.

Because different market segments are more or less likely to respond to a phone call than make a website purchase, the lead generation settings can be applied according to market segment preferences. Thus, actioning a lead could occur while the customer is actively engaged with the website, but more typically will occur after it is determined or detected that the customer is no longer engaged with the website.

In a preferred form the process for generating a sales lead includes gathering sufficient contact data for the customer to make contact with the customer via another communication channel, and measuring at least one website usage parameter. Most preferably the website usage parameter reflects the customer progress through the website, e.g. by timing the delay between interactions with the website.

For example, each time a customer progresses from one page to the next in the website sales page, lead data is captured and stored in the data storage system 108. Thus when a customer enters sales lead data in page SF2, this is recorded upon moving to SF3. A timer is set at this point and is reset every time an action, e.g. a progression to the next page, is recorded.

Sales leads are set to be captured for follow-up if the timer reaches a predetermined threshold value before a new action is recorded. The timer is set to create a lead at 30 minutes of inactivity although other timeout limits can be set.

If the time out value is reached, the system effectively determines that the customer has stopped their progress through the sales pages and an alternative means for converting the customer to a sale is needed.

The optimisation of these settings can be tailored to the customer, based on the market segment, time between pages and sales funnel progression. Thus in some embodiments, the threshold can be set on the basis of customer data gathered from the sales pages. For instance demographics data gathered by the system can be used as one (of possibly many) factors that contribute to the determination of the threshold.

At any point where the predetermined lead capture condition is met, a sales lead can be generated (step 204 of FIG. 2) and sales lead data for a customer stored in the database 108.

In some instances the lead generation system can be set to determine whether to intervene in the customer's progress through the website, once important information on the customer has been gathered, and immediately direct leads to the outbound dialler system 116; or to leave the customer to continue through the web conversion process.

Lead Capture Regulation

Many factors go into determine how many leads are needed by the outbound call centre 112 at any given time. Thus the preferred embodiment of the present system implements a method for regulating the desired/required rate or number of leads created. In the method the website presented to each customer is varied to tailor the rate of lead capture.

At any one time, different customers can be provided with different versions of the sales pages. In the preferred embodiment the different versions of the data capturing portions of the sales pages are displayed to customers as they enter the second page SF2 of the sales pages. For example in a preferred form, the webpage presented to a customer can be selected from a number, say 3, versions of the sales page. One of the pages available for display can be configured not to capture customer data, so as not to generate leads. Of course any practical number of versions could be maintained. The method is able to be tailored to generate the desired number or rate of leads by allowing the setting of percentages of customers who will see each version of the sales pages, for example 50% of customers could be served version A (with aggressive data capture), 30% could be presented with version B (with less data capture) and, 20% can be presented with version C (having no sales data capture).

The level of capture can be set with a scheduling feature to allow a change in the percentage mix to be scheduled for any time of the day and any day of the week or to meet a target rate of data capture. Scheduling can be simple, e.g. time of day, day of week. Alternatively a capture rate algorithm can be used that tailors the rate or number of sales leads captured based on the number of consultants available to follow-up on generated leads, consultants contact rates (predicted or actual), predicted or actual "time on phone" for consultants.

The level of lead capture can be set for all customers or set differently for different classes of customer. The class into which a customer is put can be determined based on data entered by the customer into a sales page or other website or customer parameter, e.g. IP address, referring website or a webpage thereof, predicted sales propensity etc.

Web Content Optimisation

At each stage of the website the system gathers additional information about the customer e.g. by the data they enter into the sales pages or through the manner in which they interact with the system. Each piece of information can be used to tailor content on the webpages generated for the customer. Thus the webserver 102 is configured to adjust the content of webpages generated for transmission to each customer. The webpages are dynamically generated on the basis of one or more of: customer referrer data; and sales data captured on one or more sales pages previously accessed by the customer. Table 1 indicates the type of data that might be captured for a customer, at different sales pages in the website. The means to gather sales data can include fields in forms presented to a customer; check boxes, radio buttons or the like; drop down menus; or other interactive element of a webpage or the like.

The data to be captured can include any type of data that is pertinent to the product or service being sold, or data from which predictions about buying propensity can be inferred or predicted.

Handling of Leads

In a preferred embodiment of the present invention, decisions regarding routing of sales leads, and capture of sales leads is based on an analysis of captured customer data and captured sales consultant data. In order to perform these analytics it is necessary to build a model of customer behaviour and consultant performance.

In one form, the model is based on a logistic regression model run over a pool of historical web-derived sales lead data. The historical data model may additionally or alternatively be gathered from an inbound call centre, ie customer data captured from previous customer enquiries. This historical data is used to determine whether there is a relationship between the sales lead data from the website and a customer's likelihood to make a purchase. The output of the model is a sales propensity value for each sales lead that represents the predicted probability of that customer making a purchase. As will be appreciated, as new sales leads are gathered and processed by the system the propensity model can be updated. Updating can be performed on any practical time scale, daily, weekly, monthly, or in realtime etc.

Outbound Telephone Communication and Dialling Method

As noted above, sales leads will be captured and used for making outbound sales calls in the outbound call centre system 112. The sales leads are pre-processed at step 206 and fed into the sales propensity model in step 208 to determine a predicted sales propensity value for the sales lead.

Next a batch of leads are sorted based on their respective predicted sales propensity values to form a priority queue for feeding to the dialler 116. In the preferred form, sales leads are sorted into a queue and loaded into the dialler software's "hopper" in incremental batches (in step 210). New batches could, for example be uploaded every 15 minutes. Of course other time intervals could be used. Moreover fixed (or dynamically determined) numbers of leads could be included in each batch.

The priority queue is ordered from leads with the highest probability of conversion to those with the lowest. Accordingly, the dialler makes calls to the customers in the hopper that have the highest predicted probability of being converted in preference to those with a lower chance of success. This means that each time the dialler hopper is re-filled only the sales leads with the lowest sales propensity value are lost, whereas those with the highest propensity for conversion will have been preferentially called.

Customer records that have a conversion probability, i.e. a propensity value, under a predetermined threshold (e.g. 10%) are excluded from the queue and sent to another communications medium at step 212, so that outbound call productivity is maximised. Similarly in step 212, calls that cannot be connected after a predetermined number of attempts are also sent to the secondary communications channel, such as an automated e-mail campaign.

Sales leads that can't be e-mailed and have a low probability of conversion (low sales propensity score) and are therefore continually passed over in call allocation will expire after a set period of time, and deleted.

Call Timing

As noted above, the lead generation system can be set to immediately direct a lead to the outbound dialler system to call the customer while he or she is on the website. More commonly the system will determine a later time to make a call. In one case, leads are included in a batch for the dialler at a fixed time after the lead is gathered, say 30 minutes. The following description describes an exemplary method for making follow up calls if a first call to a customer fails.

In step 212, in the event that a call cannot be established with a customer, (e.g. is not answered, is engaged, an answering machine answers, or other call failure occurs) a call-timing sub-process is implemented to attempt to determine the best time to make a follow-up call.

For example, data mining may determine that women aged 25-34, who are looking for a single policy, may convert best when called between 6 and 8 pm. The output of this model will thus dictate the best time to call certain types of lead.

The reasoning behind using this method on the second and subsequent dial attempts is that, on creation of the lead from the website, the first attempt is preferably placed as soon as possible while the lead is "hot", regardless of demographics. However if that initial call fails to be connected then, since the lead is no longer "hot" the subsequent calls should be made more carefully with the goal of:
Minimising the number of calls made.
Maximising the answer rate.
Maximising conversion rates.
Minimising call duration.

As noted above, in step 212, calls that cannot be connected after a predetermined number of attempts are sent to the secondary communications channel, such as an automated e-mail campaign. Whilst in the preferred embodiment leads are initially called when hot, the system may determine a different time for the initial call, on the basis of a timing algorithm as described above.

A preferred time to call the lead may also be determined, at least in part, by a model derived from (i) customer data gathered from a plurality of customers that initiated contact with an electronic communications interface, and (ii) time data recording for each of said customers a time or time period at which the customer interacted with the electronic communications interface. The electronic communications interface may for example be an email server, a web server, or a phone exchange for an inbound call centre.

Such a model may be useful as a sales propensity model because the timing of when a person calls to make an enquiry, on their own accord, tends to indicate the time that they are best to contact. By calling leads at that time a consultant is optimising their likelihood of successfully engaging with a person from the segment of the population. Successful engagement may be defined by a variety of positive outcomes, not just by whether or not a sale is made. For example, successful engagement can be merely reaching the person, as such an outcome can improve the efficiency of the call centre. Other outcomes include sending a message to or leaving a message with the person, wherein the message results in a response, preferably a positive response, from the person. Ideally, the engagement results in completing an agreement or financial transaction with the client, for example by the client purchasing or committing to purchase goods or services.

Figure 2A:
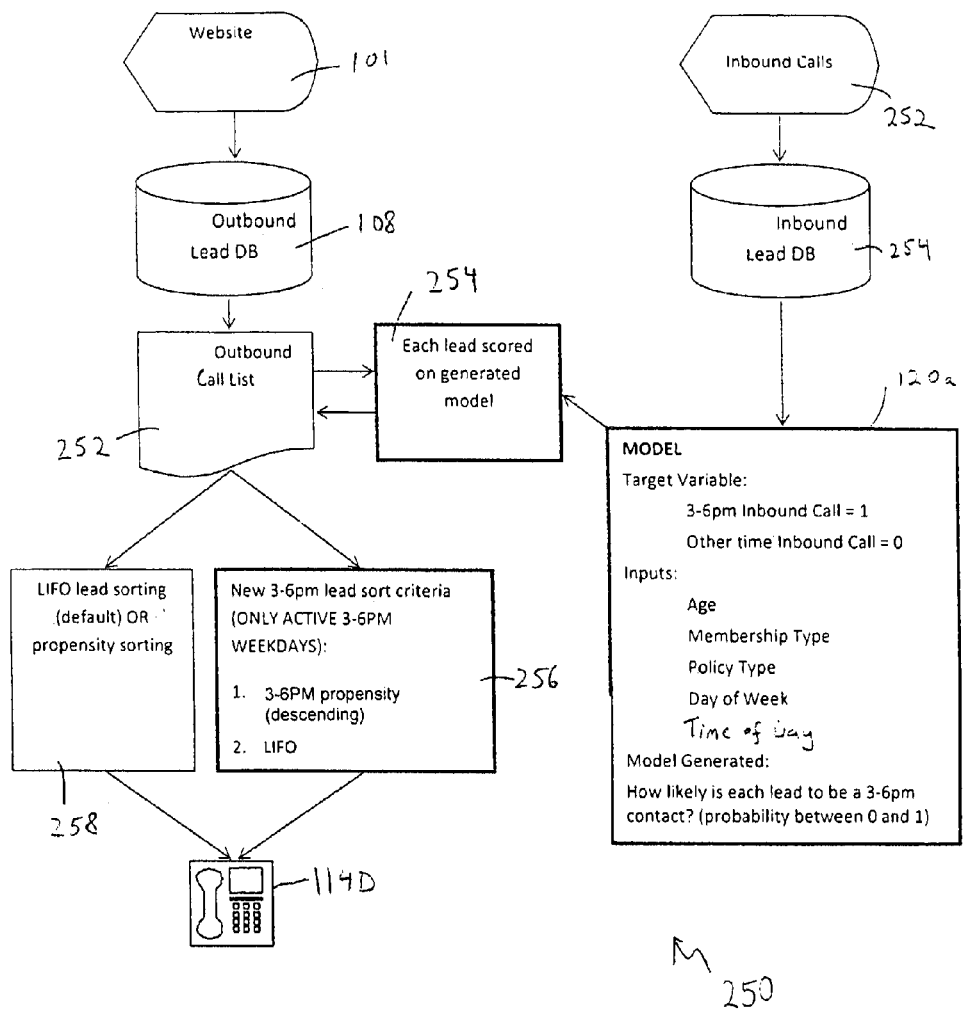
FIG. 2a illustrates a method for scheduling outbound calls in a call centre in accordance with an aspect of the present invention.
Figure 3A:
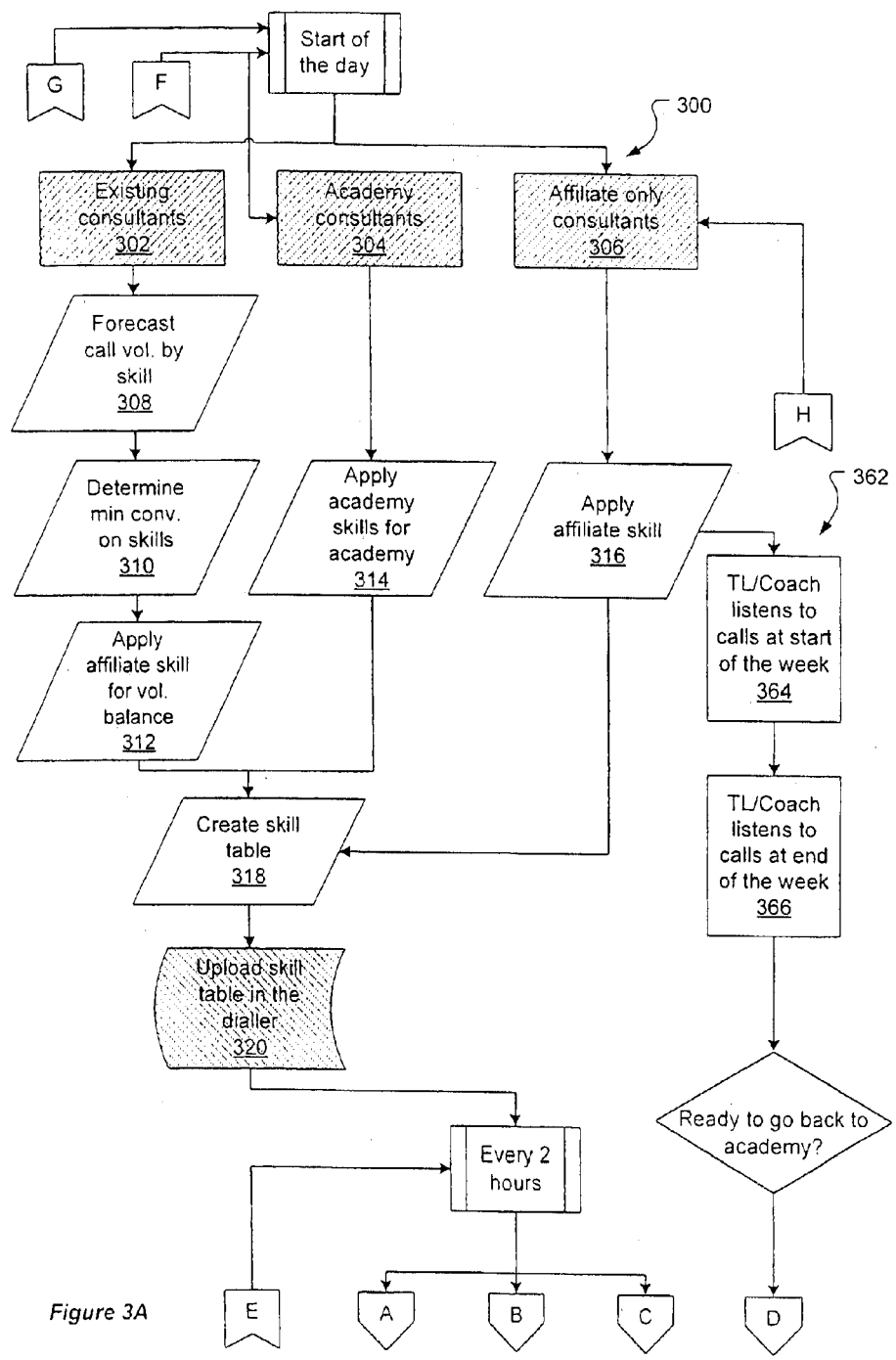
FIGS. 3A to 3C illustrate a process for selecting consultants for assigning to sales leads requiring a particular skill.
Figure 3B:
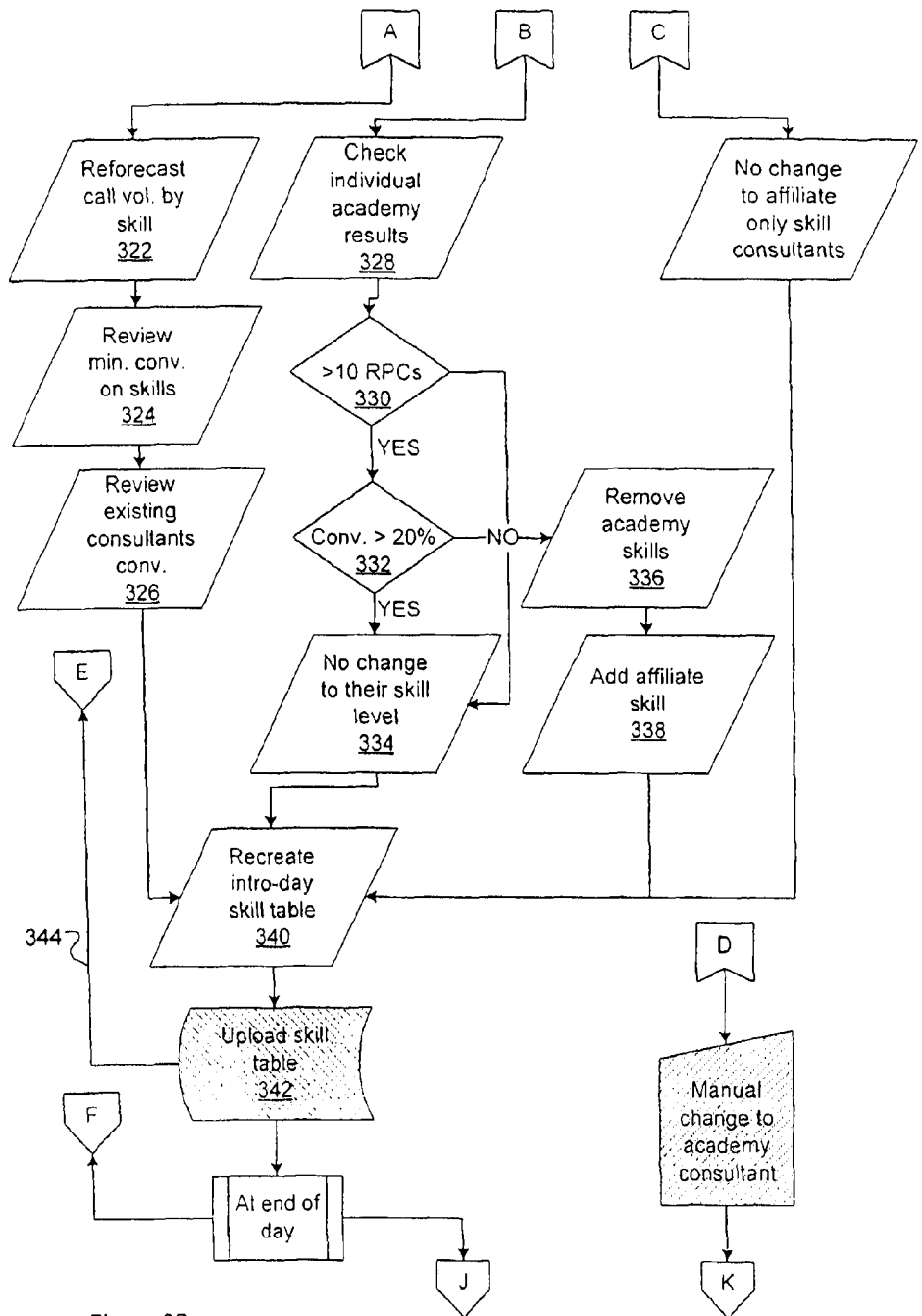
Figure 3C:
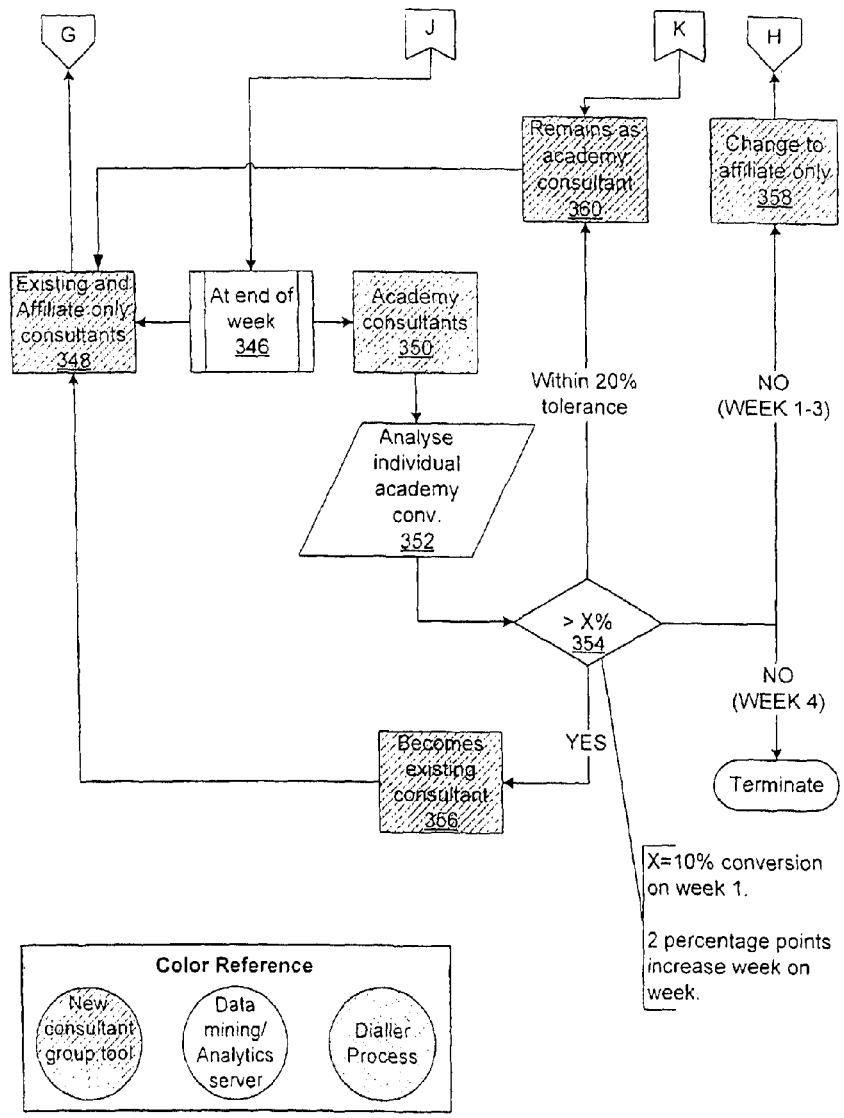

An example of a method 250 that uses the model is now described with reference to FIG. 2a and to the system in FIG. 1. Inbound calls 252 are received by an inbound call centre 113, customer data is collected from the inbound calls, as described hereinbefore, and stored in an inbound lead database 254, which may be integrated within or separate to the inbound call centre 113 or system controller 118 as a component of data storage system 104. The system controller 118 processes the data to determine a propensity model 120a, which in the example in FIG. 2a is based on the following inputs: the age of the inbound lead, the membership type and policy type about which the inbound lead called, and the day of the week and time of day that the inbound call was made.

The model 120a essentially aggregates all the inbound calls for different segments of the population and scores them from 0 to 1 based on their probability of engaging with a communications channel (in this case, the inbound call centre 113) during a specified part of the day, specifically 3 pm to 6 pm on a weekday. For example, based on the historical data in the inbound lead database 254, the model may attribute a score of 0.6 given to people aged 30-37, who are buying a hospital-only policy for the whole family on a Wednesday. This would mean that that for this segment of the population, 60% of the inbound calls were made during the specified 3 pm to 6 pm part of a weekday, while the 40% were during some other period of a weekday or on the weekend.

The separation of leads into segments of the population is done automatically by the predictive modelling algorithm, such as a "Random Forrest" algorithm, based on which segments are deemed most statistically significant in the historical data. This model is refreshed regularly, to take into account more up-to-date data. The determined probability is, optionally, rounded up to "1" or down to "0" to create a binary likelihood output as to whether people from that market segment are, based on the historical data, likely to call during the time period (output "1") or unlikely to call during the time period (output "0").

For some applications, the model may modified so that the prediction relates to a time on a specific day, rather than being spread across a plurality of days, such as on all weekdays. In other cases, the model may be used to predict availability of a sales lead during one time period (eg 3 pm to 6 pm), based on the historical data from a different time period (eg 8 am to 10 am).

To operate the outbound call centre 112, the system controller 118 reads new outbound sales leads from the sales lead 108 component of data storage system 104. In the example of FIG. 2a the outbound sales lead is derived from the website 101 hosted on web server 102.

The sales leads may conveniently be read in batches, such as by 2000 leads at a time or by an expected number of leads that can be called over a 2 hour period. The leads in the batch are entered into an outboard call list 252 for sorting. At step 254, each lead is attributed a score of "0" or "1" as defined by the model 120a.

In one implementation, if a lead is "1" it is removed from call list and entered into a second outbound list 256 for the 3 pm-6 pm specified period. All leads attributed "0" are maintained in the first outbound list 258 and sorted in accordance with one of two ways. The first way, a default sorting method, is that the maintained leads are organised into a Last In First Out (LIFO) queue, whereby the most recent lead (ie the lead that most recently used the Website 101) is called first. The other way is by using an embodiment of a propensity model as described in the following sections of this specification. Outside of the 3 pm-6 pm weekday time period, the sorted leads that have been attributed "0" are sent via call router 124 and dialler 116 to connect a consultant at terminal 114D to the next sales lead in the queue.

During the 3 pm-6 pm weekday period, the router 124 instead programs the dialler 116 to call a sorted version of the second outbound list 256, either according to a LIFO queue, or by ranking the leads from those having the highest raw probability for success (ie not-rounded up or down) according to the propensity model 120a to those having the lowest probability, or by ranking the list in accordance with another propensity model as described in the following sections of this specification.

If the first or second list runs out, or is not long enough to fill the designated time for which the list is scheduled to operate, the list can be filled with leads from the other of the first or second list.

In another implementation, lead sorting can be conducted in real-time, whereby the propensity model acts as a filter that is turned on during the 3 pm-6 pm time interval and turned off outside of that time interval. For example, when the model is active, the lead sorting is achieved by evaluating each lead in the queue, and filtering out all leads attributed "0" by the model.

In a further implementation, the outbound call list 252 extracted from the outbound lead table 108 is scored against the propensity model 120a before the onset of the 3 pm-6 pm interval, for example the scoring could be calculated at the beginning of a given day. Scores generated by the system controller 118 are used to populate a new field in the outbound list 252 or in a table of the leads in dialler 116. During the 3 pm-6 pm part of the day, the field is used to filter or prioritise the leads, whereas the field is ignored during any other parts of the day. Further, on days when the model is irrelevant or inaccurate (for example, during school holidays), this field is ignored.

Although these examples have been described with reference to the 3 pm-6 pm weekday time period, it is appreciated that the model may be applied to other time period, and/or to multiple distinct time periods.

Skills-Based Routing

In step 214 of the method an analytics-based approach is used to select a sales consultant to be assigned to handle a sales call with a customer over the communications channel established by the dialler. More specifically the method involves, determining the sales consultant (amongst a group that is available) that has the highest likelihood of making a sale to the customer, and assigning that sales consultant to the call.

In order to do this it is necessary to build a model of consultant performance in terms of the sales lead data. In a similar manner to the sales propensity model a consultant conversion model can be built by storing sales consultant performance data describing a plurality of sales interactions between a sales consultant and a corresponding plurality of customers in a database 110 and performing a regression analysis of the sales performance for the sales consultant over the plurality of sales interactions, to generate a model predictive of sales performance of a sales consultant for a given sales lead. In practice the coefficients of the customer conversion probability model, built on past sales performance, are used to continually update the skill scores of each consultant (possibly on an hourly/daily/realtime basis). The consultant conversion model preferably includes a skill ranking in respect of one or more skills for each sales consultant. Skills can be defined which relate to a wide variety of factors that can be used to characterise a sales lead. For example, a sales lead could be classified according to any one or more of the following types of parameter:

a type of product being marketed;
a demographic grouping of the customer;
a source of the customer referral; and
a reason that the customer is interested in a product;
other sales lead data, such as website behaviour and usage data of the customer.

Thus skills can be defined that rate a consultant's proficiency in handling calls characterised by any one of these parameters or combinations of multiple parameters.

The method can be limited to assigning a sales consultant to a communications channel with a customer from a group consisting of those sales consultants that are physically available, or who are predicted to be physically available upon establishment of the channel. In one form, all consultants are assigned a ranked score (e.g. a score that is a normalised ranking between 1 and 20) for each possible skill, and the available consultant with the highest ranking is allocated to a sales lead. However this may not yield the optimum output, if one considers that a call that results in a sale takes longer to complete than a call that does not. This can mean that the best consultant (i.e. a consultant having the highest raking in a given skill) is more likely to be engaged in another call when a new lead is available. This can result in sales leads often being allocated to a consultant with a low predicted conversion rate (i.e. low rating for the skill needed for the call) but who is physically available when needed.

Alternatively the establishment of the communications channel can be delayed (possibly within pre-set limits) until the sales consultant having the highest likelihood of making a sale to the customer, is, or is predicted to be, available. In a preferred implementation of this embodiment, the number of consultants who are made available to receive any given lead is limited to a subset of consultants that have the best rankings on a particular skill needed to handle the sales lead (as determined by the sales lead data of the lead). The skills based routing algorithm is used to select a required number of consultants to get through the number of available leads within a particular time frame, but at the same time balance this with the desire to only have calls handled by high converting consultants (i.e. consultants with a high skill ranking). The size of this subset and the consultant allocated form it can be determined on the basis of one or more of the following;

a number of sales leads needing a particular skill;
a current proficiency level of the sales consultants in respect of a particular skill;
a current proficiency level of the sales consultants in respect of the another skill;
a relative revenue/profitability/value of sales leads requiring a skill.

It should be noted that the goal is to maximise total revenue from all leads irrespective of the skills needed to handle each lead, thus the allocation process will preferably optimise allocation of calls and allocation of consultants to calls requiring specific skills to achieve this aim. For example, if a sales consultant has a normalised ranking of 17 in a first skill, and 19 in a second skill, but leads in the second skill either have less revenue attached to them or are less likely overall to lead to a sale (i.e. they will on average generate less revenue) the optimisation algorithm may exclude the consultant from handling calls needing their best (second) skill because allocating that consultant to calls needing the second skill does not optimise total revenue. For example, using such an optimisation algorithm, if leads are very strong in a certain skill type then the system will optimise allocation of consultants to account for this. The algorithm will expand the number of available consultants to service the high demand skill by loosening the skill limitation on consultants servicing the skill. In this way, the optimisation algorithm is reading skill demand volumes and adjusting the size of the subset of all consultants doing this work, by changing the cut off skill for the skill.

In one form, optimisation of the allocation process can be achieved using a linear programming optimiser, or other optimisation methodology. The algorithm may dictate holding a lead until one of the applicable consultants is physically available, if necessary.

Preferably the system will re-calculate the optimal allocation of consultants periodically or in real time, or when certain events occur. For example, in the event that less than a threshold number of consultants (say 1) are available to handle leads requiring a certain skill, this may indicate that an insufficiently large group of consultants are able to be allocated work in that class.

In the event that a sale is made, data for the sale is captured in step 216 and stored in the data storage system 104. Over time as data is collected for all calls handled by consultants and leads, this data is used to adjust skill levels for consultants and finetune the call allocation algorithm.

The call allocation system can additionally include a process that selectively allocates calls of a specific type (i.e. sales leads requiring a specific skill) to a consultant to either train the consultant in the skill, or test his or her proficiency in the skill. Over time this allows new consultants to be added into the subset of consultants that are made available to handle calls requiring the specific skill.

FIG. 300 illustrates a process which can be used by a skills based routing process or system according to an embodiment of the present invention. The process 300 begins at some point in time (e.g. the start of a day) and explains how, in at least one embodiment of the present invention, consultants can be assigned to the subset of consultants in which consultants are allocated sales leads requiring a given skill. In this example, only a single skill will be discussed, however multiple skills can be treated in the same way, and balancing of allocation of calls requiring different skills can operate as described above.

In an initial set of steps 302, 304 and 306 a plurality of sales consultants are assigned to one of three groups. The first group 302 termed 'existing consultants' are sales consultants having a defined or known proficiency in the skill in question. Sales consultants assigned in 304 to the second group, termed here 'academy consultants' are consultants who are being trained in a particular skill, or who are being assessed as to their level of proficiency in the particular skill. In 306, a third group of relatively unskilled consultants are assigned to an 'affiliate only' group. These consultants may either be very inexperienced or be consultants who have possibly performed poorly in other assigned tasks and need to develop further skills. The affiliate only group of consultants are assigned leads from sources that generate leads with low propensity to buy, e.g. direct marketing or less targeted email or advertising campaigns. These leads are of relatively low average value and accordingly a good material to train consultants on.

In practice, where a plurality of skills are defined, a consultant's workload may include work assigned to them on the basis of their proficiency in a plurality of skills, as well as some academy skills work, in skills in which they are not yet proficient, and even a proportion of affiliate work if there are insufficient sales leads requiring particular skills to be allocated to the sales consultant at a particular time.

Turning firstly to the consultants ranked in step 302 as 'existing consultants' having particular skill. As described above, the lead generation subsystem will determine a volume of calls requiring a particular skill, either due to the level of leads being captured by the website or through some other means. On the basis of this forecast call volume in step 310, the number of sales consultants required to handle the call volume is determined. In order to have the right size subset of consultants to allocate to the sales leads being generated by the website a threshold skill level is determined for sales consultants to be put into the subset of sales consultants from which consultants will be drawn and allocated to the received sales leads. Because the sales leads requiring the particular skill will not typically occupy a consultant's full time, their remaining allocation of calls will come from one of the affiliate programs as determined in step 312.

Turning now to the academy consultants defined at 304, these consultants are assigned to the particular skill at 314 such that some number of leads assigned to them will require the academy skill being developed or assessed. Other leads will come from either other academy skills or affiliate programs.

For the affiliate program consultants defined in step 306, they do not have any leads requiring a particular skill assigned to them, but have calls from an affiliate program assigned to them as defined in step 316.

Next, at 318 a skills table is generated which includes the first group of consultants drawn from the subset of consultants having known proficiencies in the skill for which calls are to be allocated, a second group of consultants being academy consultants. The consultants from the affiliate group may also be added to the skill table but are not assigned any leads requiring any skill. This skill table once created is uploaded to the dialler system, in step 320, such that when communications channels with customers are generated they can be assigned to a consultant in a manner that matches the sales lead to a consultant either with an appropriate proficiency in the skill or training in the skill.

Once this set up process is completed the dialler begins establishing calls to leads that have been collected by the system. The next group of steps to be described will describe a process for assessing consultants in the existing consultants group, academy consultants group and affiliates only consultants group, followed by a discussion of a process for reallocation of the roles of consultants amongst these groups. The assessment, and reallocation of consultants amongst the groups may be performed at any reasonable interval, such as daily, over several hours or hourly, or on shorter time frames and possibly even in real time as each call is completed.

Beginning with the existing consultants in step 322, as the day progresses it will be necessary to reforecast the volume of calls requiring a particular skill. As the volume of calls changes in step 322 it is necessary, in step 324, to review, and possibly adjust the threshold proficiency of consultants allocated to the subset of consultants handling calls requiring the particular skill. As will be appreciated from the discussion above, the assignment of the minimum proficiency level may be determined partly on the number of consultants required for other skills, in order to maximise revenue from all calls. Next, in step 326, the current subset of existing consultants are reviewed for current performance against the new minimum conversion level or proficiency rating. If the required rating goes up, e.g. to contract the subset of possible consultants handling the leads in question, some consultants may be dropped from the subset assigned to the skill. If the number of leads grows, the minimum conversion level or proficiency rating required for consultants may decrease, so as to grow the pool of consultants available to handle the calls.

Beginning at step 328, each academy consultant has his or her performance reviewed. Firstly at 330 the level of leads provided to the academy consultant, which require the particular skill being assessed, is determined. If more than some predetermined number of calls, e.g. ten calls is received, the consultant's conversion rate is assessed at 332. In the event that the consultant's conversion rate is greater than some predetermined standard, e.g. a conversion threshold of greater than 20%, they remain in the academy group in step 334. If less than the predetermined number of leads have been provided to the academy consultant in step 330, they are also retained in the academy group until they receive at least the threshold number of calls. In the event that the consultant has received the requisite number of leads, but their conversion rate is less than the predefined standard, the consultants can be removed from the academy group and assigned to a third group, being the affiliates group. In this case the consultant is removed from the listing of consultants to be assigned calls requiring particular skill, and instead they are assigned to leads from the affiliate program at step 338.

In the same manner as described in step 318, the skills table is regenerated at 340 and at 342 the updated skills table is uploaded into the dialler to enable allocation of calls to the consultants to continue according to the new consultant categorisations.

As can be seen at 344, the process from steps 322 to 342 can be repeated several times throughout a day. Periodically, e.g. the end of the day or end of the week, the progress of existing consultants and academy consultants are assessed. In the illustrated example this begins at step 346. The consultants remaining as existing consultants in the first group, and affiliate consultants in the third group are decided at step 348. Those consultants in the second group, i.e. the academy consultants at 350 are passed an assessment process beginning at 352 with an analysis of each individual academy consultant's conversion rate. The conversion rate of each consultant is compared to a predefined standard at step 354. If their conversion rate exceeds the standard, the consultants may be promoted to the first group of consultants, i.e. the existing consultants at step 356. If the academy consultant's conversion rate is below the predefined standard, one of two things can happen. Either they can be put back to the 'affiliate only' group such that they can develop their skills on lower value leads, or they can remain as an academy consultant. Which of these two outcomes occurs, depends on whether the academy consultant was well below the required standard in which case they become an affiliate only consultant at step 358. If the academy consultant is within some predefined tolerance of the required standard, e.g. within 20% of the required tolerance, the academy consultant remains an academy consultant at step 360. Thus an academy consultant can be put back into the process and continue their training in developing a skill. In order to encourage development of skills for academy consultants, with each iteration of the academy call allocation process as described above, the accepted standard for the each repeating academy consultant may be incremented. For example, the predefined standard could be a 10% conversion rate on sales lead requiring the skill for the consultant's first weeks as an academy consultant, but increased by two percentage points for each week they have been active in the particular skill. Thus, over time an academy consultant's skills needs to continually rise in order to progress through the academy process.

Also described in the flow chart 300 is a manual process 362 which can be performed by a team leader or coach to encourage affiliate only or academy consultants to improve their skills. This process 362 begins at 364 with the team leader or coach reviewing calls at some predefined time. At step 366, later calls made by the consultant are again reviewed in order to determine improvement in skills. A good period of time might be a week in which to allow the consultant's skills to develop. If it is determined in this process that the consultant's skills have developed sufficiently, the team leader or coach can manually decide to enter an affiliate only consultant from the third group into the academy group such that they develop their proficiency in a particular skill.

As should be appreciated form the foregoing, consultants who are experienced in one skill could be academy consultants for another skill. In practice, this will mean that for a particular consultant, some leads assigned to him or her will be leads which require a skill for which the consultant already has a determined proficiency level, whereas other leads provided will be for a skill for which the consultant is an academy consultant. Some proportion may also be affiliate programs. In this manner, a consultant may be periodically training throughout a day and will be spending the remaining part of their time working within the skills which they are proficient.

The choice as to which skill should be developed by a particular consultant may be determined manually or automatically. For example, a correlation may be determined between highly effective consultants in one skill and those consultants' abilities to perform well in another skill.

These correlations can be used to determine which skill a particular consultant should be trained in next. Alternatively, every coach or team leader could decide that a particular consultant should learn a particular skill or the consultant may choose a new skill to learn. Other allocation processes are also possible.

Automated Lead Follow-Up

In step 212, if a call to a customer cannot be established the lead is assigned to an automated follow-up procedure 218. In a first case, at 220, if a call cannot be established another electronic messages is sent to the lead, preferably by SMS.

This message is effectively a text message that is set to the customer's mobile telephone number (if given) asking if they would like to be contacted by telephone to discuss goods or services for sale. In the event that a predetermined response to the invitation is received, e.g. the customer replies with a SMS saying "yes", the lead is sent back to the dialler 116. In the present embodiment the returned sales lead will be called immediately, by skipping the propensity sorting performed in step 210, and the call is entered into the hopper of the dialler 116 at or near the front of the outbound call queue. If the customer has not replied to the electronic message within a set time period, then their record will be forward to the automatic e-mail campaign system in step 222.

Email Campaign

In step 222, if the attempt to establish a telecommunications channel with a customer is unsuccessful, an email campaign can be commenced. Similarly, if a sales lead is gathered that does not have a telephone number associated with it, an email campaign can be commenced.

If the lead is passed to step 222 an email message is sent to the customer. Preferably the email message includes a link that can be used by the customer to access the website (possibly for a second time). It is preferable that customers being returned to the website have previously been provided, via the website, a recommendation of goods or services that are suited to their expressed requirements or otherwise recommended, as is presented on webpage SF5 of the present example. In this case, data relating to the customers needs is stored and is used to dynamically generate e-mails 222.1, 222.2 with content based on their needs (for example, insurance for Pregnancy, Optical, Dental etc.)

In the event that the customer follows the link sent in the email campaign at 224 the customer is returned 226 to predetermined page of the website. In one form, where the customer had previously had product(s) or service(s) recommended to him or her by the website, either on the basis of search terms entered by the customer or sales lead data gathered by the website, the predetermined page includes the previously recommended product(s) or service(s).

In the event that the customer returns to the website via, the link the method can include generating a new sales lead for the customer, said sales lead including data indicating the source of the sales lead. By indicating the source of the lead to be an email campaign the sales lead is prevented from repeatedly cycling through the "lead—call attempt—e-mail process" and irritating the customer.

Alternatively, the e-mail process can include e-mails that contain a "call me" button that has largely the same effect as the "yes" reply SMS mechanism described in connection with process 220. In the event that the customer clicks the button the customer's sales lead is re-inserted in the dialler queue such that it overrides the propensity model hopper process 210 and the customer's record is placed at the front of the outbound call queue.

Website Marketing Methods

There are 4 main sources of leads to the website 200, they are:
 paid search engine marketing;
 organic search/search engine optimisation;
 external email campaigns; and
 display and re-targeting.

The analytics-based approach described herein can be customer to support a business's web marketing strategies, as follows.

Paid Search/Search Engine Marketing

Paid searches involve buying priority placement in search results when certain keywords are used by the searcher. Buying the search terms involved bidding in a real time auction against competitors for positions on specified keywords within search engines like Google, Yahoo & Bing to name a few examples. One method of performing this process is using software that can determine a bidding strategy based on return on investment calculation per keyword. Thus where a keyword is associated with a sales lead, e.g. the sales lead originated from a search including a keyword, data relating to sales from that sales lead can be fed back via path 230 for use in the keyword bidding process in step 232. The price to bid for a keyword is then able to be set, based on factors including time of day, week and other information linked to probability of online conversion of leads, revenue per sale. This aims to ensure that the bidding process 232 maximises profit.

The sales propensity model can also use the search keywords associated with a lead to determined a sales propensity of the lead. In this way sales leads that are associated with specific high converting keywords could be prioritised higher than leads associated with low converting keywords.

Organic Search and Search Engine Optimisation

Organic search results are listings on search engine results pages that appear because of their relevance to the search terms, as opposed to their being advertisements. Generally content on the website, or a webpage thereof is optimised or created to boost rankings for an individual keyword. Ranking on a search engine is defined by an algorithm behind the search engine. This algorithm is not public knowledge and may change on a daily basis. As noted above, the sales propensity model can also use the search keywords associated with a lead to determined a sales propensity of the lead. In this way sales leads that are associated with specific high converting keywords could be prioritised higher than leads associated with low converting keywords.

External E-Mail Campaigns

During peak times e-mail lists can be purchased to promote the products or services. The customers on these lists have agreed to receive e-mails of a promotional nature from third parties. Incentives are sometimes offered to get customers to click on the email or to purchase a product or service.

External e-mails can sometimes deliver customers to the website 200 that are less likely to buy, than leads from other sources, therefore these leads can be lowered in the prioritisation list for the outbound call centre 112. Knowing which sales leads are coming from this channel can be used to drive a specific follow up e-mail campaign if the visitor leaves their e-mail address on the website, or may affect the sales propensity score of the sales lead.

Display and Re-Targeting

Web banner advertising or integrated placements on the third party websites can sometimes be used to deliver extra customers to the website 200. These campaigns can be run at certain periods of the year. Such leads may be have a generally low conversion rate meaning that prospects coming from this channel that are less likely to buy. Knowing which sales leads are coming from this channel can affect the sales propensity score of the sales lead.

Re-targeting of certain website visitors can be performed when a customer reaches a predetermined point in the website. In this case a browser cookie can be used to tag the customer. Then, if the customer leaves the website without making a purchase, or possibly without leaving sufficient information to qualify as a sales lead, the cookie can be used to present targeted advertising, e.g. in the form of banner advertisements, on other websites in an attempt to get them back onto the website 200 to make a purchase.

From the foregoing, it can be seen that the various aspects of the present invention leverage an analytics based approach to marketing that seeks to maximise effectiveness and return on investment in marketing.

The concept of a call or communication channel described herein should be understood broadly as any meaning a communications channel irrespective of medium over which two remotely located parties can communicate with each other. These can be conventional telephone calls, telephone calls in radio, cellular or satellite communications systems, data channels that can be used for voice communications (VOIP systems, SKYPE, etc.), text (instant messaging services, SMS, etc.) or video communications (SKYPE, video conference, etc.) or other medium.

As will be appreciated, the methods described herein are performed using suitably configured data processing systems. These systems include computing devices operating under control of software or firmware. The computing devices can include memory for storing the software and a processor system, operating under the control of the software instructions. The processor system can include one or more processors, running on one or more machines.

Summary of Further Methods, Systems and Computer Systems Described Herein:

Another broad concept described herein is a method for determining whether or not to contact a customer that is using a website, via another communications channel based on the customer's interaction with the website, by analysing the customer's website usage and or data captured about the customer.

Most preferably the method includes generating a sales lead for actioning via a channel other than the website. Actioning the lead could occur while the customer is actively engaged with the website, but more typically will occur after it is determined or detected that the customer is no longer engaged with the website. The former case could, for example, be used if the customer falls into a demographic that is highly unlikely to make a purchase on the website but more likely to make a purchase via the other channel, e.g. on the telephone. The latter case might occur upon a timeout being reached that indicates the customer has lost interest in the website. In this case, the customer's website usage and/or data that they have entered into the website, might indicate that they are highly likely to make a purchase if presented with an opportunity via another mode of interaction.

In one method for gathering sales lead data from a website, in which the website includes a plurality of webpages including a plurality of sales pages, said sales pages including means to gather sales data from a customer, the method includes: gathering data associated with a customer as the customer interacts with at least one sales page of the website; measuring at least one website usage parameter for the customer accessing the sales pages; and in the event that the at least one measured website usage parameter meets at least one predetermined criterion, and the data associated with the customer includes contact details for the customer; generating a sales lead corresponding to the customer.

Measuring at least one website usage parameter can be measuring the customer progress through the website, e.g. by timing the delay between interactions with the website. For example, the time the customer takes to perform an action, such as completion of one or more form elements in a webpage, or the time the customer takes to progress from one page to another of the website. In the event that the time taken is longer than a threshold value, a lead can be generated.

The timing can be performed by starting a timer each time an action being measured occurs e.g. every time the customer follows a link to the next web page or moves onto a new data entry field or menu selection, a timer could be re-started. In the event that no new action is detected prior to the timer reaching a predetermined value, it can be determined that the customer has stopped their progress through the sales pages and an alternative means for converting the customer to a sale is needed. Consequently, sales lead data associated with the customer can be captured. The sales lead can then be stored for later use or transmitted to another system for action.

In one form of the method, the threshold is set to represent 30 minutes of customer inactivity. In some embodiments, the threshold can be set on the basis of customer data gathered from the sales pages. For instance demographics data gathered by the system can be used as one (of possibly many) factor(s) that contribute to the determination of the threshold. In some instances, data representing the customer can be analysed to determine whether to intervene in the customer activity in the website via another communications channel while the customer is still using the website.

Other disclosed examples are based on a broad concept that the number of sales leads, or type of sales leads generated by a website can be controlled based on a plurality of factors.

For example, there is also described a method to gather sales lead data from a website. The website including a plurality of webpages including a plurality of sales pages, said sales pages including means to gather sales data from a customer. The method includes dynamically generating the sales pages to influence the how data is captured. In a preferred form the sales pages are generated to influence the rate of capture of data from which sales leads can be generated. In another form the sales pages are generated to influence a type of customer from which data is captured.

A target rate of data capture can be determined on the basis of one or more factors that influence either the rate of lead use, for example: time of day, day of week, number of consultants available to follow-up on generated leads, consultants contact rates (predicted or actual), predicted or actual "time on phone" for consultants. Influencing of the rate of data capture can include selecting different versions of a webpage for serving to the customer to attempt to enhance or limit data capture from customers. At any one time, different customers can be provided with different versions of the sales pages. The method can include determining a proportion of customers that receive each version of the sales pages. By varying the relative proportions of the pages served, the rate of lead generation can be influenced. The level of lead capture can be set for all customers or set differently for different classes of customer. The class into which a customer is put can be determined based on data entered by the customer into a sales page or other website or customer parameter, e.g. IP address, referring website or a webpage etc. It should be noted that, while the present example is expressed in terms of the 'rate of capture' the process could be performed on the basis of the number of leads captured or used, or a target number of leads to be gathered.

In one form an automatic algorithm, based on statistical analysis of past sales leads is used to change the data capture rate. In this regard, the algorithm can be adapted to attempt to capture additional data from customers that are determined by a statistical model to have a relatively high likelihood of making a purchase.

Also disclosed is a method for optimising website content for delivery to a customer. The website includes a plurality of webpages including a plurality of sales pages including means to gather sales data from a customer. The method includes dynamically generating a web page on the basis of one or more of: customer referrer data; and sales data captured on one or more sales pages previously accessed by the customer. The means to gather sales data can include fields in forms presented to a customer; check boxes, radio buttons or the like; or drop down menus.

The sales pages can include a plurality of pages that are intended to be accessed by the customer, each of which seeks to capture data about the customer. The data to be captured includes demographic data, identity data, product or service preference data, product or service historical purchase data, website usage data.

The identity data can include, but are not limited to: name, address, contact details (e.g. email address, telephone or facsimile number), personal identification number, customer identification code, password or other data allowing the identity of the customer to be determined.

Product or service preference data can include, but is not limited to, characteristics of products or services that the customer prefers (or does not like) and data relating to products or services that the customer is considering purchasing; a customer's reason for seeking a good or service.

Website usage data can include, but is not limited to: data representing how the customer arrived at the website, e.g. from which search engine, online advertisement, referring email; keywords used in a websearch; which pages of the website are accessed by the customer; searches conducted within the website; pages of the website that have been bookmarked by the customer; a time spent on certain pages of the website or in aggregate; product or service marketing documents downloaded.

Demographic data can include, but is not limited to data related to the age, residence, educational or employment status, wealth or income related factors, family arrangements.

Historical purchase data can include, but is not limited to, data related to what products or services the customer currently uses or possesses; or has used or possessed in the past; and feedback on those products or services.

Another concept disclosed herein is based on the inventors' insight that a customer's propensity to purchase goods or services can be predicted from their usage of a website marketing such goods or services. Moreover it has been the present inventors have determined that such a prediction can be used to control the manner in which the goods and services are marketed to the customer. The determined propensity of a customer to make a purchase can be used, for example, to determine which communication channel should be used to interact with the customer, to route calls to consultants in an outbound call centre, or to program a dialler in an outbound call centre.

Also disclosed herein is a method including:
(a) receiving sales lead data for a customer, said data including at least customer contact data; and
(b) calculating sales propensity data relating to the sales lead.

Preferably the sales lead is collected from a website. The sales lead data could be collected according to an method described herein.

Preferably the calculation of the sales propensity data for the sales lead is based on a sales propensity model determined from a plurality of previous customers. Thus, yet another method of building a sales propensity model includes:
(a) storing sales lead data and sales data for a plurality of customers; and
(b) modelling the sales propensity of sales leads, to result in actual sales.

The method further includes, updating the stored sales lead and sales data; e.g. by capturing new sales leads and associated sales data and repeating step (b) to update the predictive model. Updating of the model could be performed over any suitable time period including in realtime.

Preferably the step of modelling the sales propensity of a sales lead is performed using logistic regression. Other algorithms could also be used, including but not limited to artificial neural networks, support vector modelling and genetic algorithms. In a preferred form, the sales lead data is gathered from a website. However, non-website-derived inputs may also be included in methods disclosed herein. Non-website inputs could include, but are not limited to, personality, tone of voice, demeanour and other data that a consultant may gain from an interaction with a customer.

Another described concept involves ordering communications with customers primarily on the basis of their propensity to purchase. Thus, there is described a method of communicating with a plurality of customers, the method including: attempting to establish communications with the customers over a communications channel in an order determined at least partly on the basis of a predicted propensity of one or more of the plurality of customers to purchase goods or services.

Preferably the method includes determining the predicted propensity of a customer to purchase good or services using a propensity model that has been developed on the basis of a statistical analysis of past customers.

The method can include: (a) receiving sales lead data for a customer and predicted sales propensity data for the customer, said predicted sales propensity data reflecting a predicted likelihood that the customer will purchase a good or service; and (b) determining a priority queue for communicating with the customers on the basis of the predicted sales propensity data for the customers.

The process of determining the priority queue from data relating to a plurality of customers can be performed separately to the process of communicating with the customer (or attempting to communicate with the customer).

Preferably the customer communications system forms part of a telemarketing system. Most preferably it includes a dialler for attempting to establish a telecommunications channel with a customer. The customer communications system is preferably configured to prioritise those customers with a higher predicted sales propensity level over those with a lower predicted sales propensity. In such a system the method can operate to call those customers that have the highest predicted likelihood of buying first.

The method can include, determining that the predicted sales propensity of a customer is below a threshold level and excluding them from the priority queue. The method can include assigning the excluded customers to a secondary communications channel.

Most preferably the method involves, detecting those customers with a predicted sales propensity below a certain cut-off level and instead of passing them to the telemarketing system, assigning those customers to a group to be contacted via a secondary medium, such as an electronic message such as email or SMS, or post.

In the case where the method includes a step of attempting to open a telecommunications channel with a customer, the method can include establishing a communications channel between the customer and a sales consultant. The method can further include determining a sales consultant to be assigned to handle communications with the customer over the channel. The sales consultant can be determined on the basis of a statistical analysis of past performance of each sales consultant. Most preferably the method includes, determining the sales consultant having the highest likelihood of making a sale to the customer, and assigning that sales consultant to the communication.

In the event that the attempt to establish a telecommunications channel with a customer is unsuccessful the method can include assigning the customer to a secondary communications channel. Preferably the secondary communication channel is email or other form of electronic messaging, such as SMS.

In the event that the attempt to establish a telecommunications channel with a customer is unsuccessful the method can include repeating the attempt to establish a telecommunications channel with the customer. The method can further include determining a time at which to attempt to establish the channel. The time can be determined in accordance with a sales propensity model. In one embodiment the timing can be based on a segmentation model based on likelihood of being available in combination with the time the lead was created. If several attempts are needed to establish a channel, each attempt could be made at a different time of day, or day of week, depending on the factors noted above.

Further disclosed is a method including:
(a) storing, sales consultant performance data describing a plurality of sales interactions between a sales consultant and a corresponding plurality of customers, said consultant performance data including sales lead data relating to the customers; and
(b) modelling the sales performance for the sales consultant over the plurality of sales interactions, to enable prediction of sales performance of the sales consultant.

The method further includes, updating the stored sales consultant performance data; and repeating step (b) to update the predictive model. Updating of the model could be performed over any suitable time period including in real-time.

A method of this type can be used in certain embodiments of the methods described herein for assigning a customer consultant to a sales lead. In a preferred embodiment the method includes, determining the predicted performance of a plurality of sales consultants and selecting the sales consultant with the best predicted performance for the sales lead.

The method can include defining a plurality of customer consultant skill areas and determining a proficiency level for at least one skill for each of a plurality of consultants. Preferably sales consultants are assigned to a sales lead on the basis of a determined proficiency in a skill area. Each sales lead can have sales lead data that allows a corresponding customer consultant skill area corresponding to the sales lead to be determined.

The method can include assigning a sales consultant to a communications channel with a customer from a group consisting of those sales consultants that are available, or who are predicted to be available upon establishment of the channel. Alternatively the establishment of the communications channel can be delayed until the sales consultant having the highest likelihood of making a sale to the customer, is, or is predicted to be, available. This process can be seen as an example of a process that includes, determining a variation of a sales lead's position in the priority queue. In a preferred form, the selection of sales consultant can be limited to a subset of all sales consultants. In particular, the subset of consultants can be chosen on the basis of a predicted likelihood to convert a sales lead (i.e. make a sale), based on their proficiency in a skill required to handle the sales lead. In one form the size of this subset can be determined on the basis of one or more of the following;
- a number of sales leads needing a particular skill;
- a current proficiency level of the sales consultants in respect of the particular skill;
- a current proficiency level of the sales consultants in respect of the another skill;
- a relative revenue/profitability/value of sales leads requiring a skill.

In this example the ultimate goal is to maximise total revenue from all leads irrespective of the skills needed to handle each lead, thus the allocation process will preferably optimise allocation of calls and allocation of consultants to achieve this aim. Optimisation of this allocation process can be performed using a wide variety of techniques, including linear programming optimisation.

A method comprising:
(a) defining a first group of sales consultants having a determined proficiency in a skill area;
(b) defining a second group of sales consultants to acquire a proficiency in the skill area;
(c) assigning sales leads in a marketing communications system such that a plurality of sales leads are assigned to each sales consultant in the second group;
(d) for a sales consultant in the second group determining a proficiency in the skill area over the plurality of sales leads; and in the event the determined proficiency of the sales consultant is over a predetermined standard, adding the sales consultant to the first group.

The method can include removing the sales consultant from the second group.

In the event that the determined proficiency is less than the predetermined standard the method can include assigning the consultant to a third group. The method can include, if the sales consultant is within a predetermined tolerance of the predetermined standard, (e.g. just below it) the method includes determining that the sales consultant remains in the second group and repeating steps (c) and (d). The predetermined standard can be varied when steps (c) and (d) are repeated.

The standard can be defined by a numerical parameter. Preferably the parameter is defined in relation to a conversion rate for the assigned sales leads.

In the event that the attempt to establish a telecommunications channel with a customer is unsuccessful a method may include sending an electronic message to the customer. Preferably the electronic message includes an invitation to be contacted regarding a good or service. The method can include: awaiting a response to the electronic message; and in the event that a predetermined response to the invitation is received, the method can further include, attempting to establish a telecommunications channel with a customer. A new sales lead relating to the customer could be generated. Preferably the sales lead created in this way is inserted in the priority queue without reference to the sales propensity data for the sales lead. Most preferably the sales lead is inserted at or near the front of the priority queue. For example, if the customer responds to the email or SMS message a lead corresponding to them will then be re-inserted into the dialler, at the front of the dialling queue and they will be called as soon as possible.

In the event that the attempt to establish a telecommunications channel with a customer is unsuccessful a method may include sending an electronic message to the customer, the message including a website identifier that can be used by the customer to access a website, including a plurality of sales pages having means to gather sales data from the customer. Preferably the identifier is a link to a predetermined page of the website. Most preferably the predetermined page of the website is a page including product or service data, previously presented to the customer. In one form, where the customer had previously had product(s) or service(s) recommended to him or her by the website, either on the basis of search terms entered by the customer or sales lead data gathered by the website, the predetermined page includes the previously recommended product(s) or service(s). These messages can be tailored by demographic.

In the event that the customer returns to the website via the link the method can include generating a new sales lead for the customer, said sales lead including data indicating the source of the sales lead.

Further disclosed herein is a method of optimising web advertising or search engine performance of one or more pages of a website, the method including:
(a) gathering sales lead data for a customer via a website, the sales lead data including referrer data reflecting one or more search keywords that were used by the customer to find the website;
(b) using the sales lead data relating to a customer to contact the customer, using a telecommunications channel;
(c) storing referring keyword data by associating the outcome of the contact with the one or more search keyword(s).

The referring keyword data can include, one or more of: a search keyword, search engine, or address of a search engine that were a referrer to the website.

The method can include, optimising search engine strategy on the basis of the stored referring keyword data. For example, the optimisation includes determining one or more of the following:

(a) which keywords to purchase for paid placement advertisements on a search engine;
(b) search engines on which paid placement advertisements should be made;
(c) when (day, time, coincident with some other event, etc.) should placement advertisements be made;
(d) a ranking of keywords or search engines for any of the above;
(e) a value associated with a keyword, for determining a bidding strategy for buying paid placement advertisements on a search engine.

The value of a keyword could be determined on the basis of a sales propensity model described herein.

The method can additionally include determining a correlation between a search keyword and a sale of goods and services.

The method can include optimising at least one webpage of the website for search engine performance upon the entry of search keywords that closely correlate with sales.

It should be noted that purchasing goods can include the supply of associated services and the supply of a service can include the provision of associated goods.

As with the methods of the present invention, similarly, a system, and components of such a system (e.g. a dialler, webserver, system controller etc.) may be provided to implement any one or more of the methods described herein. Such components can be programmed with a set of instructions that when executed by a processing system cause the component to implement at least part of the method.

The invention claimed is:

1. A method for scheduling outbound communications to sales leads, wherein the scheduling of communications is based, at least partly, on a model of customer behaviour wherein the model is derived from (i) customer data gathered from a plurality of customers that initiated contact with an electronic communications interface, and (ii) time data recording for each of said customers, a time or time period at which said contact initiated by the customer with the electronic communications interface took place, wherein the model predicts, for one or more time periods and for one or more of the different segments of a population, a likelihood of successfully engaging with a person from the segment of the population, and wherein the scheduling includes prioritising the outbound communications to a sales lead relative to other sales leads during one or more defined time periods based on the segment of the population corresponding to the sales lead.

2. A method according to claim 1, wherein the outbound communications are outbound calls on an outbound call center.

3. A method according to claim 1, wherein said likelihood is a probability of a person from the respective segment of the population interacting with the electronic communications interface at the respective time or time period, compared with at least one other time period.

4. A method according to claim 1, wherein the electronic communications interface is an inbound call center.

5. A method according to claim 1, wherein the electronic communications interface is a website.

6. A method according to claim 1, wherein the respective probability is rounded up or down to create a binary likelihood output as to whether people from the respective segment are likely or unlikely to call at the respective time or time period.

7. A method according to claim 1, wherein the one or more defined time periods is a time period that correlates to a period in which a success rate in contacting and/or completing a transaction with sales leads is lower than an average success rate for the day.

8. A method according to claim 1, wherein the one or more defined time periods is a time period approximately between 3 pm and 6 pm on a weekday.

9. A method according to claim 1, wherein the method includes deriving the model from the customer data and the time data.

10. A method according to claim 1, wherein the prioritizing further comprises scoring sales leads according to the model, and prioritizing or filtering the sales leads, based on the score.

11. A non-transient computer readable medium storing thereon software instructions which when implemented by a computer system cause the computer system to schedule outbound communications to sales leads, wherein the scheduling of communications is based, at least partly, on a model of customer behavior wherein the model is derived from (i) customer data gathered from a plurality of customers that initiated contact with an electronic communications interface, and (ii) time data recording for each of said customers, a time or time period at which said contact initiated by the customer with the electronic communications interface took place, wherein the model predicts, for one or more time periods and for one or more of the different segments of a population, a likelihood of successfully engaging with a person from the segment of the population, and wherein the scheduling includes prioritizing the outbound communications to a sales lead relative to other sales leads during one or more defined time periods based on the segment of the population corresponding to the sales lead.

12. A computer system configured to schedule outbound communications to sales leads, wherein the scheduling of communications is based, at least partly, on a model of customer behavior wherein the model is derived from (i) customer data gathered from a plurality of customers that initiated contact with an electronic communications interface, and (ii) time data recording for each of said customers, a time or time period at which said contact initiated by the customer with the electronic communications interface took place, wherein the model predicts, for one or more time periods and for one or more of the different segments of a population, a likelihood of successfully engaging with a person from the segment of the population, and wherein the scheduling includes prioritizing the outbound communications to a sales lead relative to other sales leads during one or more defined time periods based on the segment of the population corresponding to the sales lead.

13. The computer system according to claim 12, wherein the computer system comprises a component configured to establish communications channels between a sales lead and a sales consultant.

14. The system according to claim 13, wherein the component configured to establish communications channels between a customer and a sales consultant is a programmable dialler.

15. A method of determining a preferred time to make an outbound communication to a sales lead comprising making the determination based, at least partly, on a model of customer behaviour wherein the model is derived from (i) customer data gathered from a plurality of customers that initiated contact with an electronic communications interface, and (ii) time data recording for each of said customers, a time or time period at which said contact initiated by the customer with the electronic communications interface took place, wherein the model predicts, for one or more time periods and for one or more of the different segments of a population, a likelihood of successfully engaging with a person from the segment of the population.

16. A method of scheduling an outbound communication to a sales lead, wherein the scheduling is based, at least partly, on a model of customer behaviour wherein the model is derived from (i) customer data gathered from a plurality of customers that initiated contact with an electronic communications interface, and (ii) time data recording for each of said customers, a time or time period at which said customers initiated with the customer with the electronic communications interface took place, wherein the model predicts, for one or more time periods and for one or more of the different segments of a population, a likelihood of successfully engaging with a person from the segment of the population, and wherein the scheduling includes determining a preferred time to make the outbound communication to a sales lead based on the segment of the population corresponding to the sales lead.

* * * * *

UNITED STATES PATENT AND TRADEMARK OFFICE
CERTIFICATE OF CORRECTION

PATENT NO.       : 9,674,354 B2  
APPLICATION NO.  : 14/433375  
DATED            : June 6, 2017  
INVENTOR(S)      : Damien Michael Trevor Waller, Tony Ian George Laing and Yuval Marom It is certified that error appears in the above-identified patent and that said Letters Patent is hereby corrected as shown below:

In the Claims

Claim 16, Column 29, Line 9-11: delete "said customers initiated with the customer with the electronic communications interface took place," and insert --said contact initiated by the customer with the electronic communications interface took place,--

Signed and Sealed this
Twenty-seventh Day of March, 2018

Andrei Iancu
*Director of the United States Patent and Trademark Office*